United States Patent
Liu et al.

(10) Patent No.: US 9,904,856 B2
(45) Date of Patent: Feb. 27, 2018

(54) METHOD AND APPARATUS FOR DETECTING TARGET OBJECT IN BLIND AREA OF VEHICLE

(71) Applicant: Neusoft Corporation, Shenyang (CN)

(72) Inventors: Wei Liu, Shenyang (CN); Chengwei Duan, Shenyang (CN); Huai Yuan, Shenyang (CN)

(73) Assignee: NEUSOFT CORPORATION, Shenyang (CN)

( * ) Notice: Subject to any disclaimer, the term of this patent is extended or adjusted under 35 U.S.C. 154(b) by 101 days.

(21) Appl. No.: 14/634,901

(22) Filed: Mar. 2, 2015

(65) Prior Publication Data

US 2015/0339533 A1 Nov. 26, 2015

(30) Foreign Application Priority Data

May 22, 2014 (CN) .......................... 2014 1 0218793

(51) Int. Cl.
*G06K 9/00* (2006.01)
*G06K 9/52* (2006.01)
(Continued)

(52) U.S. Cl.
CPC ........... *G06K 9/00805* (2013.01); *G06K 9/46* (2013.01); *G06K 9/52* (2013.01); *G06K 9/6201* (2013.01);
(Continued)

(58) Field of Classification Search
CPC ........ G06K 9/00805; G06K 9/62; G06K 9/52; G06K 9/46; G06K 9/6201; G06T 7/0044;
(Continued)

(56) References Cited

U.S. PATENT DOCUMENTS 7,099,510 B2 * 8/2006 Jones .................... G06K 9/6256
348/142
2012/0026011 A1 2/2012 Yamashita
(Continued)

FOREIGN PATENT DOCUMENTS

CN 103247030 A 8/2013
CN 103745196 A 4/2014
(Continued)

OTHER PUBLICATIONS

Baur, Rafael, Alexei Efros, and Martial Hebert. "Statistics of 3d object locations in images." (2008).*
(Continued)

*Primary Examiner* — Bhavesh Mehta
*Assistant Examiner* — Menatoallah Youssef
(74) *Attorney, Agent, or Firm* — Kilpatrick Townsend & Stockton LLP (57) ABSTRACT

A method for detecting a target object in a blind area of a vehicle is provided by embodiments of the application. The method includes: acquiring at least one frame of an image generated by shooting a blind area of a vehicle by a shooting device; extracting an image feature of an area where at least one predetermined detection gate is located in the image; and matching the image feature of the area where the predetermined detection gate is located with a matching template of the predetermined detection gate to determine a target object. An apparatus for detecting a target object in a blind area of a vehicle is further provided by embodiments of the application.

8 Claims, 8 Drawing Sheets

(51) Int. Cl.
*G06K 9/46* (2006.01)
*G06K 9/62* (2006.01)
*G06T 7/73* (2017.01)

(52) U.S. Cl.
CPC ...... *G06T 7/74* (2017.01); *G06T 2207/10016* (2013.01); *G06T 2207/30261* (2013.01)

(58) Field of Classification Search
CPC ......... G06T 7/004; G06T 7/0051; G06T 7/00; G06T 2207/10016; G06T 2207/30261
See application file for complete search history.

(56) References Cited

U.S. PATENT DOCUMENTS

| | | | |
|---|---|---|---|
| 2012/0140061 A1* | 6/2012 | Zeng | G01S 13/726 348/135 |
| 2013/0054086 A1 | 2/2013 | Lo et al. | |
| 2015/0186723 A1 | 7/2015 | Liu et al. | |

FOREIGN PATENT DOCUMENTS

| | | |
|---|---|---|
| JP | 2003187228 A | 7/2003 |
| JP | 2006197034 A | 7/2006 |
| JP | 2008129676 A | 6/2008 |
| JP | 2012034076 A | 2/2012 |

OTHER PUBLICATIONS

Leutenegger, Stefan, and Philipp Krüsi. "Visual Detection of an Object of Known Geometry in a Fisheye Camera Image." 2009.*
Yang, Seung-Hun, et al. "Novel Real-Time Automobile Detection Algorithm for Blind Spot Area." Frontier and Innovation in Future Computing and Communications. Springer Netherlands, 2014. 821-832.*
Schiele, B, Fritz, M. High Level Computer Vision, Sliding Window Detection: Viola Jones Detector & Histogram of Oriented Gradients, Jun. 5, 2013.*
The first Office Action dated Apr. 5, 2016 regarding a Japanese counterpart application (2015-025721).

* cited by examiner

METHOD AND APPARATUS FOR DETECTING TARGET OBJECT IN BLIND AREA OF VEHICLE

This application claims priority to Chinese patent application No. 201410218793.4 titled "METHOD AND APPARATUS FOR DETECTING TARGET OBJECT IN BLIND AREA OF VEHICLE" and filed with the Chinese State Intellectual Property Office on May 22, 2014, which is incorporated herein by reference in its entirety.

FIELD

Embodiments of the present application relate to the technical field of detection, and in particular to a method and an apparatus for detecting a target object in a blind area of a vehicle.

BACKGROUND

This part is intended to provide background or context for embodiments of the invention stated in the claims. The description in this part is not considered as the conventional technology although the description is included in this part.

A blind area of a vehicle exists due to the structure of the vehicle. A driver sits in a driver's seat can not see target objects in the blind area. In our daily life, traffic accidents often happen due to the fact that the target object in the blind area can not be seen by the driver. In order to avoid or reduce traffic accidents due to the blind area of the vehicle, the driver is required to grasp situations in the blind area.

A technique has been proposed in which a shooting device is arranged at the rear of the vehicle, a scene in the blind area is shot by the shooting device and the shot image is detected to determine the target object in the blind area. Specifically, in the detecting process, by using an appearance feature of the target object, such as symmetry of the vehicle, shadows underneath the vehicle and a vertical edge of the vehicle, a possible candidate area of the target object is taken from the shot image, and then the target object is identified by using a knowledge-based method (such as template matching) or a classifier-based identifying method. However, there are various kinds of target objects, such as an automobile, a motorcycle and a bicycle, and even the same kind of target objects may have different shapes, for example, there is a difference in appearance between a large car and a sedan car. Therefore, it is difficult to take the possible candidate area of the target object from the shot image by using the appearance feature of the target object or to train a universal classifier applicable to various target objects for detecting the target object in the possible candidate area.

SUMMARY

To solve the above problem, a method and an apparatus for detecting a target object in a blind area of a vehicle are provided according to embodiments of the present application, which improve accuracy of detecting the target object in the blind area of the vehicle.

A method for detecting a target object in a blind area of a vehicle is provided according to an embodiment of the present application, which includes:

acquiring at least one frame of an image generated by shooting a blind area of a vehicle by a shooting device;

extracting an image feature of an area where at least one predetermined detection gate is located in the image; and matching the image feature of the area where the predetermined detection gate is located with a matching template of the predetermined detection gate, to determine a target object.

Preferably, the area where the predetermined detection gate is located includes a complete image of the target object.

Preferably, the area where the predetermined detection gate is located including the complete image of the target object includes: the range of the target object corresponding to the detection gate in the blind area of the vehicle meeting a requirement of:

an arctangent value of a ratio of a depth distance to a lateral distance from the target object included in the detection gate to the vehicle being equal to or less than a horizontal view angle of the shooting device, where the depth distance is a vertical distance from the shooting device arranged on the vehicle to a front plane of the target object, and the lateral distance is a vertical distance from a depth axis of the shooting device arranged on the vehicle to a left plane or a right plane of the target object.

Further preferably, in a case that the shooting device arranged on the vehicle is a plane camera, the arctangent value of the ratio of the depth distance to the lateral distance from the target object included in the detection gate to the vehicle being equal to or less than the horizontal view angle of the shooting device is met by meeting a requirement of:

the depth distance from the target object included in the detection gate to the vehicle being equal to or larger than $$\frac{ay \cdot \text{Cam\_H}}{imgH - v_0},$$

and the lateral distance from the target object included in the detection gate to the vehicle being equal to or less than $$\frac{ay \cdot (imgW - u_0) \cdot \text{Cam\_H}}{ax \cdot (imgH - v_0)},$$

where Cam_H is a mounting height of the plane camera, and ax, ay are inter parameters of the plane camera, and ax=f/dy, ay=f/dy, f is a focal length of the plane camera, dx is a minimum physical size of a pixel of a plane image in a horizontal direction, dy is a minimum physical size of a pixel of the plane image in a vertical direction, imgW is a pixel width of the plane image, imgH is a pixel height of the plane image, and (u0,v0) is a pixel coordinate of a center of the plane image.

Further preferably, in a case that a pixel coordinate of a lower left corner of the detection gate including the complete image of the target object in the plane image is (u,v), a pixel height of the detection gate is H, a pixel width of the detection gate is W, the depth distance of the target object included in the detection gate is VerD, the lateral distance of the target object included in the detection gate is HonD, an actual height of the target object is Obj_3DH, and an actual width of the target object is Obj_3DW, the detection gate is determined by the following equations:

$u$=Foot_col−Obj_pix$W$ $v$=Foot_row $W$=Obj_pix$W$ $H = Obj\_pixH$ where Foot_row is a row in the plane image corresponding to a lower edge of front plane of the target object, which is determined by the following equation:

$$Foot\_row = v0 + \frac{Cam\_H \cdot ay}{VerD}$$

Foot_col is a column in which a far-end pixel of the lower edge of the front plane of the target object in the plane image is located, which is determined by the following equation:

$$Foot\_col = u0 + \frac{HonD \cdot ax}{VerD}$$

Obj_pixH is a pixel height of the target object in the plane image, which is determined by the following equation:

$$Obj\_pixH = \frac{Obj\_3DH \cdot ay}{VerD}$$

Obj_pixW is a pixel width of the target object in the plane image, which is determined by the following equation:

$$Obj\_pixW = \frac{Obj\_3DW \cdot ax}{VerD}.$$

Preferably, in a case that the shooting device arranged on the vehicle is a fisheye camera, a height of the fisheye camera is Cam_H, a Euclidean distance from the target object to the fisheye camera is D, a depth distance from the target object to the fisheye camera is VerD, a lateral distance from the target object to the fisheye camera is HonD, an actual height of the target object is Obj_3DH, an actual width of the target object is Obj_3DW, a parameter of a cylinder image converted from a fisheye image is ay, a pixel coordinate of a center of the cylinder image is (u0,v0) a pixel width of the fisheye image is imgW, a pixel height of the fisheye image is imgH, a pixel coordinate of a lower left corner of the detection gate including the complete image of the target object in the cylinder image is (u,v), a pixel height of the detection gate is H, and a pixel width of the detection gate is W, the detection gate is determined by the following equations:

$u = Foot\_col - Obj\_pixW$ $v = Foot\_row$ $W = Obj\_pixW$ $H = Obj\_pixH$ where Foot_row is a row in the cylinder image corresponding to a lower edge of the front plane of the target object, which is determined by the following equation:

$$Foot\_row = \frac{Cam\_H \cdot ay}{D} + v0,$$

where $D = \sqrt{HonD^2 + VerD^2}$

Foot_col is a column in which a far-end pixel of the lower edge of the front plane of the target object in the cylinder image is located, which is determined by the following equation:

$$Foot\_col = u0 + \frac{1}{d\theta} \arctan \frac{HonD}{VerD}$$

where $d\theta$ is a horizontal angle of each pixel in the cylinder image, $$d\theta = \frac{\varphi}{imgW},$$

φ is a horizontal view angle;

Obj_pixH is a pixel height of the target object in the cylinder image, which is determined by the following equation:

$$Obj\_pixH = \frac{Obj\_3DH \cdot ay}{VerD}$$

Obj_pixW is a pixel width of the target object in the cylinder image, which is determined by the following equation:

$$Obj\_pixW \approx \frac{1}{d\theta} \cdot \frac{Obj\_3DW}{VerD}.$$

Preferably, the number of the at least one predetermined detection gate is 2n×m, where n is the number of the detection gates corresponding to the target objects which have same lateral distances and different depth distances on one side of the vehicle, and m is the number of the detection gates corresponding to the target objects which have same depth distances and different lateral distances on one side of the vehicle, where n and m are natural numbers larger than or equal to 1.

Further preferably, differences between the lateral distances of the target objects having the same depth distances and a lane width fit normal distribution.

Further preferably, matching templates of the detection gates corresponding to the target objects which have the same depth distances are the same. Alternatively, matching the image feature of the area where the predetermined detection gate is located with the matching template of the predetermined detection gate to determine the target object includes: matching the image feature of the area where the predetermined detection gate is located with the matching template of the predetermined detection gate; determining a matching degree between the matching template of the predetermined detection gate and the image feature of the area where the predetermined detection gate is located; judging whether the matching degree is larger than a predetermined judging threshold; and determining that the target object corresponding to the detection gate exists if the matching degree is larger than the predetermined judging threshold.

An apparatus for detecting a target object in a blind area of a vehicle is further provided according to an embodiment of the present application, which includes an image acquiring unit, a feature extracting unit and an object matching unit, where the image acquiring unit is configured to acquire at least one frame of an image generated by shooting a blind area of a vehicle by a shooting device;

the feature extracting unit is configured to extract an image feature of an area where at least one predetermined detection gate is located in the image; and the object matching unit is configured to match the image feature with a matching template of the detection gate, to determine a target object.

According to the embodiments of the present application, after the image of the blind area of the vehicle is acquired, feature extracting and feature matching are performed with the area where the detection gate is located in the image as an elementary unit for processing. Since feature extraction is only performed in the area which is determined by the predetermined detection gate, it is unnecessary to segment out the possible candidate area of the target object. Therefore, a difficulty in image segmentation brought by factors such as kind, shape and distance of the target object is avoided, and it is beneficial to improve the accuracy of detecting the target object. In addition, the complete image of the target object is contained in the detection gate, so that the target object occupies an as large as possible area in the area where the detection door is located, thus it is beneficial to extract the image feature. In addition, the complete image of the target object is contained in each detection gate, so that the appearance difference among the target objects has less effect on training of the matching template. Accordingly a general and universal matching template can be obtained by training, a large number of matching templates are avoided, and it is beneficial to improve the detecting accuracy for the target object.

BRIEF DESCRIPTION OF THE DRAWINGS

The above and other objectives, features and advantages according to the embodiments of the present application are easy to be understood by detailed description hereinafter in conjunction with the accompanying drawings. In the accompanying drawings, several embodiments are illustrated in an exemplary rather than a limited way.

DETAILED DESCRIPTION

The principle and spirit of the present application will be described below with reference to several exemplary embodiments. It should be understood that these embodiments are given to make those skilled in the art better understand and thus implement the present application, but not to limit the scope of the present application in any way. In contrast, these embodiments are provided so that the present application is thorough and complete and the scope of the present application can be fully expressed to those skilled in the art.

Figure 1:
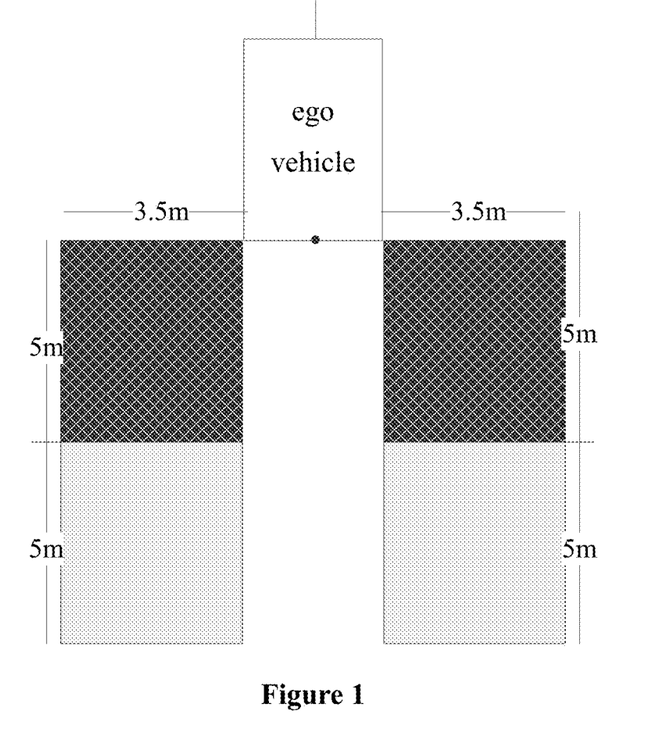
FIG. 1 is a schematic diagram of a blind area of a vehicle.

FIG. 1 illustrates a common blind area of a vehicle, i.e., a blind area of the rear of a vehicle. In FIG. 1, areas with certain widths on both left and right side of a vehicle (referred to as "ego vehicle" hereinafter) are blind areas. Each of the blind areas shown in FIG. 1 is a rectangle of 3.5 m×5 m (the area behind the rectangle is an extended area of the blind area, and an early detection can be implemented by detecting a target object in the extended area; the technical solutions according to the present application can also be applied to the detection for a target object in the extended area unless otherwise specified). Size and shape of the blind area may be different due to specific conditions of various vehicles, but those skilled in the art can apply the technical thought, technical solution and technical feature to various blind areas to achieve the target object detection even in face of this difference.

The target object herein may be various objects entering the blind area, such as other vehicles, motorcycles, bicycles and pedestrians. There are various ways for the target object to enter the blind area of the ego vehicle. Taking "other vehicle" entering the blind area of the ego vehicle as an example, the "other vehicle" may come from a direction opposite to a forward direction of the ego vehicle and enter the blind area from front to back, or come from a direction the same with the forward direction of the ego vehicle and enter the blind area from back to front. The target object with high flexibility such as the pedestrian or the bicycles may also laterally enter the blind area of the ego vehicle. In addition, the number of the target objects entering the blind area or the area that the target object enters may be different. For example, there are two symmetrical blind areas in FIG. 1, multiple target objects may simultaneously or non-simultaneously enter the blind areas and each target object may independently enter one of the two blind areas. However, no matter how the target object enters the blind area, how many target objects enter the blind area or which area the target object enters, basic principles of blind area detection according to the present application are the same, and those skilled in the art can apply the technical thought, the technical solution and the technical feature of one situation to another situation.

Figure 2:
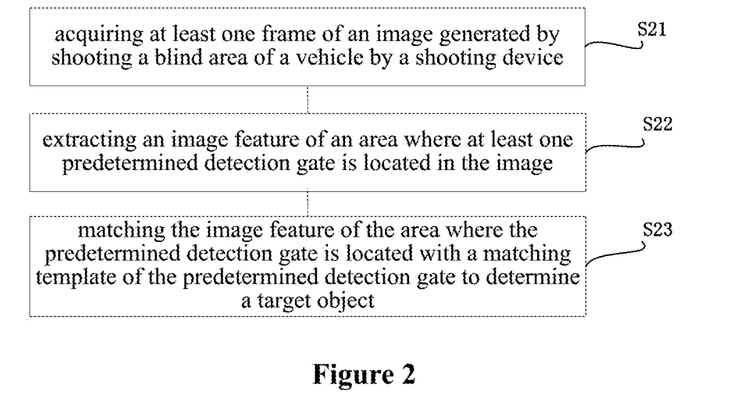
FIG. 2 is a flowchart of a method for detecting a target object in a blind area of a vehicle according to an embodiment of the present application.

As stated above, the driver sit on the driver's seat can not observe normally the target object after the target object enters the blind area of the ego vehicle, and therefore a traffic accident easily occurs. To avoid such case, a method for detecting a target object entering a blind area of a vehicle is provided according to the application. FIG. 2 illustrates a method for detecting a target object in a blind area of a vehicle according to an embodiment of the present application, which includes the following S21 to S23.

In S21, at least one frame of an image generated by shooting a blind area of a vehicle by a shooting device is acquired.

The driver can not observe the scene in the blind area of the ego vehicle, so a shooting device is usually mounted onto the ego vehicle for shooting the scene in the blind area of the ego vehicle. The blind area of the ego vehicle may be shot by recording, or may be shot by periodically taking pictures. An image showing the condition in the blind area of the ego vehicle is generated by shooting the blind area by the shooting device. One or more frames of image are acquired in order to judge whether a target object enters the blind area of the ego vehicle and which target object enters the blind area of the ego vehicle according to the present embodiment. If multiple frames of image are acquired, the multiple frames of image may be processed in serial or may be processed in parallel according to the following steps, which may depend on actual processing capacity and processing speed.

In S22, an image feature of an area where at least one predetermined detection gate is located in the image is extracted.

After the image is obtained in S21, the area where the predetermined detection gate is located serves as an elementary unit for processing, and its image feature is extracted. The detection gate herein is an elemental range for detecting whether a target object exists, and an area outside the detection gate in the image may be ignored or paid less attention to. The detection gate provides a range of an elemental unit for processing, which is not necessary an actual detecting box in the image, that is, the detection gate may be a virtual detecting window. It is to be noted that the expressions such as the detecting "gate" and the detecting "box" do not indicate that the elemental range for detection is only "rectangular", actually, the detection gate may also be triangular, circular, polygonal, or even irregular in different situations. Generally, for an information processing device such as a computer, it is more convenient and fast to process a rectangular area.

In S23, the image feature of the area where the predetermined detection gate locates is matched with a matching template of the predetermined detection gate to determine a target object.

After the image feature is extracted in S22, the extracted feature is matched with a corresponding matching template, to determine a target object. Determining the target object herein at least includes: determining whether a target object exists in the detection gate; and determining which kind of target object exists in the detection gate. Whether a target object exists in the detection gate and which kind of target object exists in the detection gate may be determined in one detecting process, such as in an accurate detection that not only whether a target object exists in a blind area of an ego vehicle is focused on but also which kind of the target object needs to be determined. Alternatively, only whether a target object exists in the detection gate is determined, such as in a preliminary detection that only whether a target object exists in a blind area of an ego vehicle needs to be determined. Matching the image feature with the matching template herein may include: firstly determining a matching degree between the matching template of the detection gate and the extracted image feature; then comparing the matching degree with a predetermined judging threshold; if the matching degree is larger than the predetermined judging threshold, determining that the target object corresponding to the detection gate exists. In practical, the above process may be implemented by using a pre-trained classifier to perform classification detection. For example, an SVM classifier or an Adaboost classifier may be used for the detection. In training the classifier, samples each including a complete target object and background samples corresponding to detection gates which have the same depth distances may be collected; a corresponding classifier may be trained by using an HOG feature, an LBP feature or the like, and a judging threshold of the classifier is obtained, in this way, a classifier of each detection gate is obtained. In practical application, besides the above method of machine learning based recognition, a method based on knowledge identification may also be used, for example, identifying by using a vertical edge feature or a movement feature, and in this case, the judging threshold may be determined based on statistic on corresponding features of the multiple target object samples.

According to the above embodiment, after acquiring the image of the blind area of the ego vehicle, feature extracting and feature matching are performed with the area where the detection gate is located in the image as an elemental unit for processing, thus a target object is determined. Compared with the conventional technology, at least the following technical effects are obtained. Since feature extraction is only performed in the area which is determined by the predetermined detection gate, it is unnecessary to segment out the possible candidate area of the target object as usually conducted in the conventional technology, therefore, a difficulty in image segmentation due to factors such as kind, shape and distance of the target object is avoided and the accuracy of detecting the target object is improved. It is to be noted that, the improved technical effect relative to the conventional technology can be obtained as long as there is at least one predetermined detection gate in the above embodiment, however, two or more detection gates may be provided for better technical effect, and each detection gate may be processed according to the above S21 to S23 to determine respectively whether a target object exists in each detection gate.

In addition, it is to be noted that, there is also a sliding-window method for detecting a target object in a blind area of an ego vehicle in the conventional technology. In this method, a sliding window is used to scan across the image, without candidate area segmentation. It is judged whether each window contains a target object by a pre-trained classifier. Compared with this method for identifying the target object, a technical effect can be obtained according to the technical solution of the present embodiment. For example, in the conventional method, each frame of image is traversed, and processing resource is wasted and processing speed is greatly affected because some area of the image contains no target object that is interested. However, in the present embodiment, each predetermined detection gate is taken as an elemental unit for processing, and not the entire area of the whole image is traversed, therefore, an "excellent" processing speed is ensured and even a real-time effect is achieved. In addition, in the embodiment, templates or classifiers are prepared for detection gates having different depth distances respectively, therefore, the change of shape and visual angle of the target object in the image can be considered. However, in the conventional method, only common template or classifier is prepared without considering the change of shape and visual angle of the target object in the image. Therefore, the detection of the embodiment is more accurate.

In the above embodiment, it may further define the notion that the detection gate contains a complete image of the target object. For example, in a normal situation, a vehicle (referred to as other vehicle) is driven toward the ego vehicle, in this case, the image of the other vehicle in the shooting device shows its front at first, then its front and side body, then only the side body, and finally vanishes. For this process, the target object detected in the detection gate is complete by setting the detection gate containing the complete image of the target object according to the present application, which is beneficial to extract the feature accurately and thus ensures accurate and effective detection for the target object. Specifically, there are two effects brought by the fact that the complete image of the target object is contained in the detection gate. For one effect, the target object occupies an as large as possible area in the area where the detection gate is located and interference brought by non-target object area is reduced in the area where the detection gate is located. For the other effect, only the area of each detection gate in the image is focused on in the detection of the target object and the area outside the detection gates in the image may be ignored, therefore, interference brought by non-target object area is reduced for the entire image. Each of the effects can improve the accuracy of extracting the image feature. Since each detection gate contains the complete image of the target object, the appearance difference among the target objects in each detection gate has little effect on the training of the matching template of the detection gate, thus a general and universal matching template can be obtained by training, a large number of matching templates are avoided, and it is beneficial to improve the detection efficiency for the target object.

Figure 3:
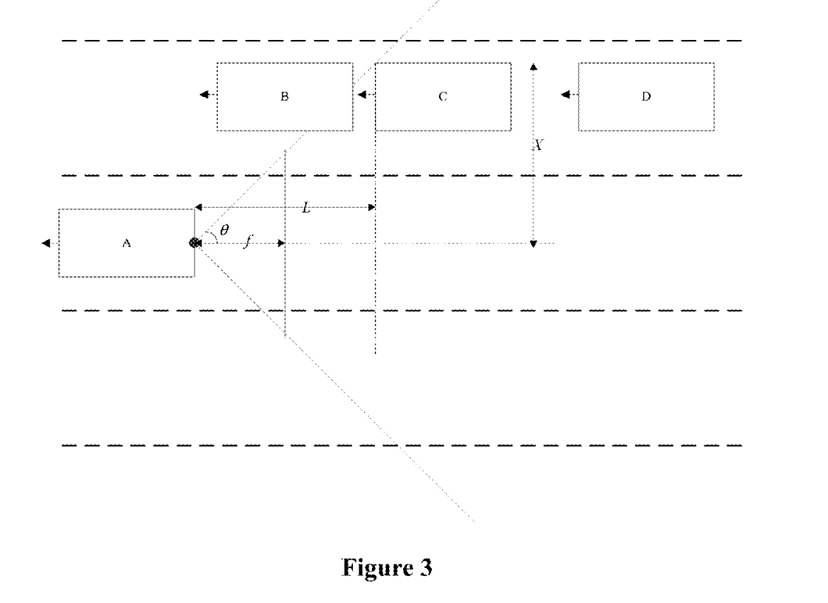
FIG. 3 is a schematic diagram of a horizontal section for imaging of a camera.

Different factors are considered to achieve in various ways the objective that the predetermined detection gate contains the complete image of the target object in the above embodiment. For example, the shooting device mounted onto the ego vehicle has a horizontal view angle, only the target object entering the range of the horizontal view angle can be imaged on an imaging plane of the shooting device, and for an area outside the horizontal view angle range or an area being partly inside and partly outside the horizontal view angle range, the target object or the complete target object can not be observed by the shooting device even the target object is in the blind area of the ego vehicle, and in this case, the same predetermined detection gate can not contain the complete image of the target object. Referring to FIG. 3, for example, the ego vehicle A is driven on a road, other vehicles B, C and D are in the blind area of the ego vehicle, a lateral distance from an outer boundary of vehicle C to a center line of the ego vehicle is X, and a depth distance from the front of vehicle C to the ego vehicle is L. In this case, vehicle C can be imaged completely on the imaging plane, but vehicle B with a small L or a vehicle with a large X can not be imaged completely on the imaging plane. Therefore, in order to ensure that the detection gate contains the complete image of the target object, the range of the target object corresponding to the detection gate in the blind area of the ego vehicle may meet the following requirement:

an arctangent value of a ratio of a depth distance to a lateral distance from the target object included in the detection gate to the ego vehicle being equal to or less than a horizontal view angle θ of the shooting device, where the depth distance is a vertical distance from the shooting device arranged on the ego vehicle to a front plane of the target object, and the lateral distance is a distance from a depth axis of the shooting device arranged on the ego vehicle to a left plane or a right plane of the target object.

The above requirement is expressed by an equation as follows:

$$\theta \geq \arctan X/L$$

Figure 4:
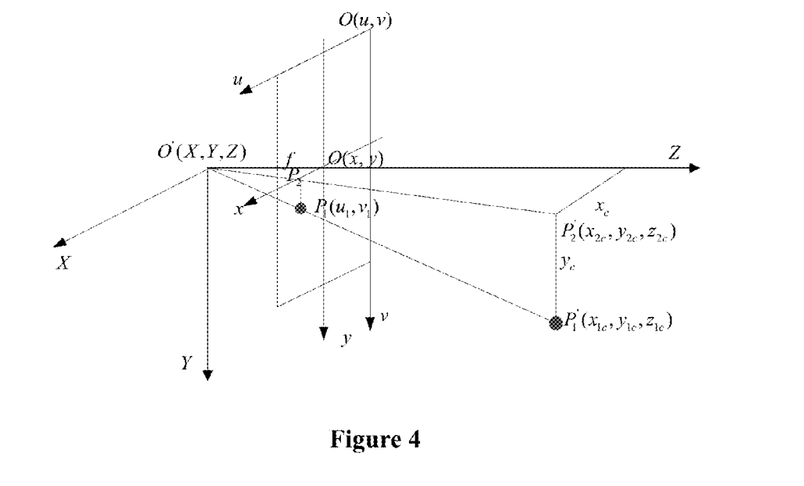
FIG. 4 is a schematic diagram of an imaging model of a plane camera.

Although the range of the target object corresponding to the detection gate in the blind area of the ego vehicle is defined above, the specific situations may be more complicated. The following discussion focuses on the requirement of the range of the target object corresponding to the detection gate in the blind area of the ego vehicle in a case that the shooting device is a plane camera, to ensure that the complete image of the target object is in some detection gate. FIG. 4 illustrates an imaging model of the plane camera. It is supposed that a mounting height of the plane camera is Cam_H, inter parameters of the plane camera are ax, ay, where ax=f/dx, ay=f/dy, a focal length of the plane camera is f, a minimum physical size of a pixel of the image in a horizontal direction is dx, a minimum physical size of a pixel of the image in a vertical direction is dy, a pixel width of the plane image is imgW, a pixel height of the plane image is imgH, and a pixel coordinate of the center of the plane image is (u0,v0), then the depth distance from the target object to the ego vehicle is equal to or larger than $$\frac{ay \cdot \text{Cam\_H}}{imgH - v_0},$$

and the lateral distance from the target object to the ego vehicle is equal to or less than $$\frac{ay \cdot (imgW - u_0) \cdot \text{Cam\_H}}{ax \cdot (imgH - v_0)}.$$

The area determined under these two conditions is the range that the target object corresponding to the detection gate is in.

Figure 5A:
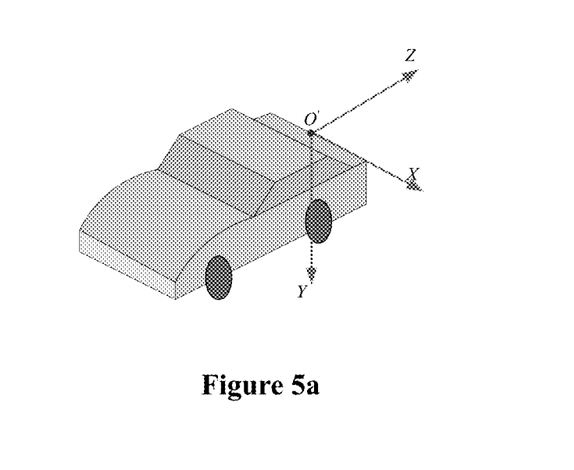
FIG. 5a is a schematic diagram of a coordinate system of a plane camera.
Figure 5B:
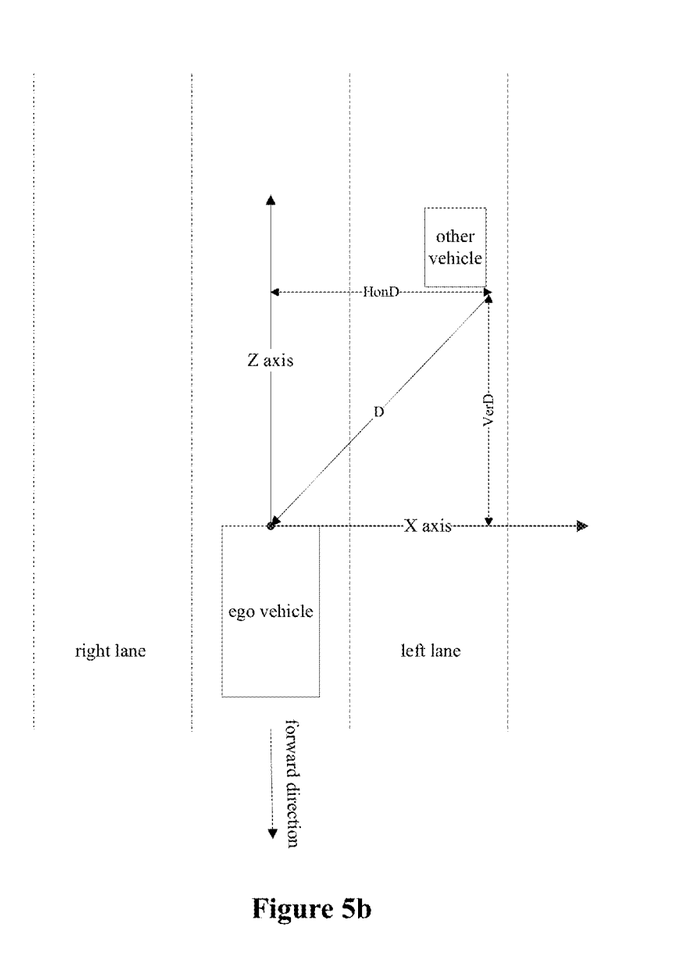
FIG. 5b is a schematic diagram of a XZ plane in a coordinate system of a camera and a position of a target object in the coordinate system.
Figure 5C:
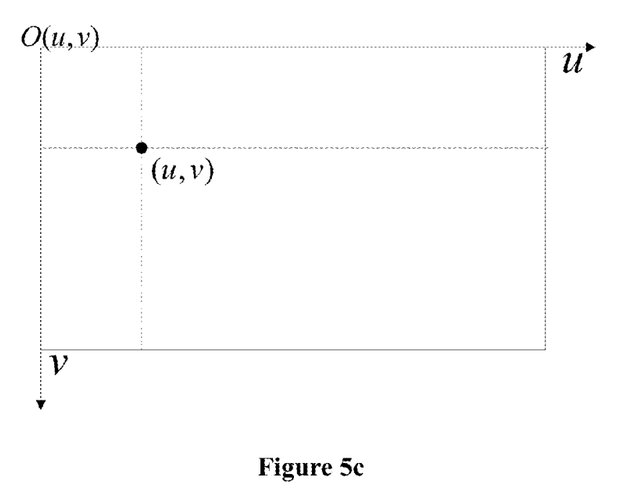
FIG. 5c is a schematic diagram of a coordinate system of a plane image.
Figure 5D:
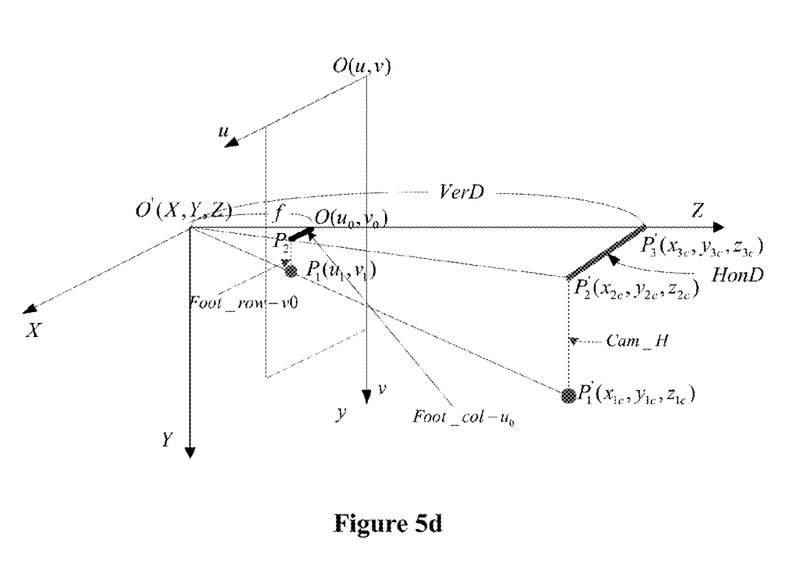
FIG. 5d is a schematic diagram of a coordinate of a determined detection gate position.

How to determine the detection gate in the image will be described below based on the above. The description is based on two common shooting devices. A case that the shooting device is a plane camera is described firstly. FIG. 5a illustrates a coordinate system of the plane camera, FIG. 5b illustrates a XZ plane of the coordinate system of the camera and a position of a target object in the coordinate system, and FIG. 5c illustrates a coordinate system of a plane image. Based on these coordinate systems, FIG. 5d illustrates a schematic diagram for determining the position of the detection gate. It is supposed that a pixel coordinate of a lower left corner of the detection gate is (u,v), a pixel height of the detection gate is H, a pixel width of the detection gate is W, the depth distance is VerD, the lateral distance is HonD, an actual height of the target object is Obj_3DH and an actual width of the target object is Obj_3DW, then the detection gate is determined by the following equations:

$$u = \text{Foot\_col} - \text{Obj\_pixW}$$

$$v = \text{Foot\_row}$$

$$W = \text{Obj\_pixW}$$

$$H = \text{Obj\_pixH}$$

(1) Foot_row is a row in the plane image corresponding to a lower edge of the front plane of the target object, which is determined by the following equation:

$$\text{Foot\_row} = v0 + \frac{\text{Cam\_H} \cdot ay}{\text{VerD}}$$

The derivation process is: O'(X,Y,Z) is an origin of the coordinate system of the camera, O(u,v) is the imaging plane, $P_1'(x_{1c}, y_{1c}, z_{1c})$ is an intersection between other vehicle and the road surface, $P_1(u_1, v_1)$ is a point on the imaging plane corresponding to $P_1'(x_{1c}, y_{1c}, z_{1c})$, $P_2'(x_{2c}, y_{2c}, z_{2c})$ is a projective point of $P_1'(x_{1c}, y_{1c}, z_{1c})$ on the plane O'XZ, distance $P_1'P_2'$ equals to the mounting height of the camera Cam_H and distance $P_2'P_3'$ equals to the lateral distance HonD, $$\frac{P_2O}{HonD} = \frac{P_1P_2}{\text{Cam\_H}} = \frac{f}{\text{VerD}}$$

can be obtained from similar triangles, i.e., $$\frac{(\text{Foot\_row} - v0) \cdot dy}{f} = \frac{\text{Cam\_H}}{\text{VerD}}$$

can be obtained, and $$\text{Foot\_row} = v0 + \frac{\text{Cam\_H} \cdot ay}{\text{VerD}}$$

can be obtained by rearranging.

(2) Foot_col is a column in which a far-end pixel of the lower edge of the front plane of the target object in the plane image is located, which is determined by the following equation:

$$\text{Foot\_col} = u0 + \frac{HonD \cdot ax}{\text{VerD}}$$

The derivation process is:

$$\frac{(\text{Foot\_col} - u_0) \cdot dx}{f} = \frac{HonD}{\text{VerD}}$$

can be obtained from similar triangles, and $$\text{Foot\_col} = u0 + \frac{HonD \cdot ax}{\text{VerD}}$$

can be obtained by rearranging.

(3) Obj_pixH is the pixel height of the target object in the plane image, which is determined by the following equation:

$$\text{Obj\_pixH} = \frac{\text{Obj\_3DH} \cdot ay}{\text{VerD}}$$

(4) Obj_pixW is the pixel width of the target object in the plane image, which is determined by the following equation:

$$\text{Obj\_pixW} = \frac{\text{Obj\_3DW} \cdot ax}{\text{VerD}}$$

Figure 6:
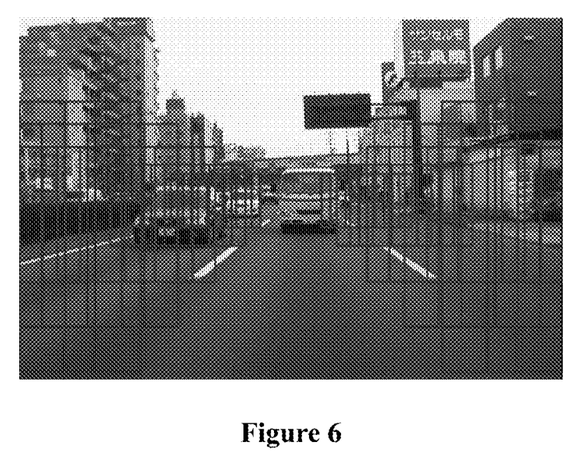
FIG. 6 is a schematic diagram of a first example of a determined detection gate position in an image.

To ensure that a target object in the blind area of the ego vehicle can be completely imaged on an imaging plane, the position of the detection gate in the image is described in detail above. The setting of the detection gate is described below by taking a left lane as an example. n×m detection gates are set in an image area corresponding to the left lane, where n is the number of the detection gates corresponding to the target objects which have same lateral distances and different depth distances on the side of the left lane, and m is the number of the detection gates corresponding to the target objects which have same depth distances and different lateral distances on the side of the left lane, n and m are natural numbers larger than or equal to 1. Setting the detection gates for the target objects in the lateral direction is to tolerate deviation of the vehicle in the range of the lane width. The positions of the target objects corresponding to the detection gates may meet the following requirement: differences between the lateral distances of the target objects having the same depth distances and a lane width fit normal distribution. It is supposed that five groups of detection gates are set in the depth direction and the number of the detection gate in each group in the lateral direction is five, as shown in FIG. 6, the target object may be required by the following distances, i.e., the complete image of the target object can be imaged onto the corresponding detection gate and thus detected accurately if the target object is at those distances: the depth distances VerD are respectively 15 m, 10 m, 6 m, 4 m and 3 m, and the lateral distances HonD are respectively 4.0 m, 3.6 m, 3.3 m, 3.1 m and 2.8 m.

It is to be noted that the target objects may be various objects as described above. In a case that the target object is a vehicle, different vehicles have different widths and heights, and thus the width and the height of the corresponding detection gate may be different. Preferably, for convenience of processing, a universal width W and height H of the vehicle are set according to the present application. The universal width and height of the vehicle may be set based on the width and height of a sedan car, or may be set based on the width and height of a midsized car, or may be set based on the width and height of a large car (such as a bus). The universal width and height of the vehicle is preferably set based on the width and height of the midsized car. For example, both the width and height of the midsized car are about 2 m, and thus the detecting width and height is set to be 2 m. In a case that the target object is a motorcycle, a ratio of the width to the height of the motorcycle is about 2:3, so the ratio of the width to the height of the detection gate is set to be 2:3. Different motorcycles have different heights, and a universal height of the motorcycle may be set for processing uniformly. For example, the height of the motorcycle is set to be 1.8 m and the width of the motorcycle is set to be 1.2 m.

Figure 7A:
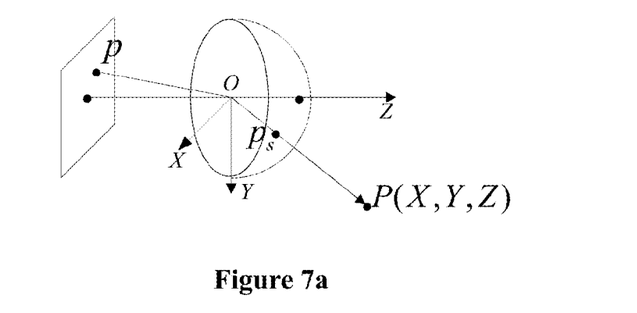
FIG. 7a is a schematic diagram of a fisheye camera model.
Figure 7B:
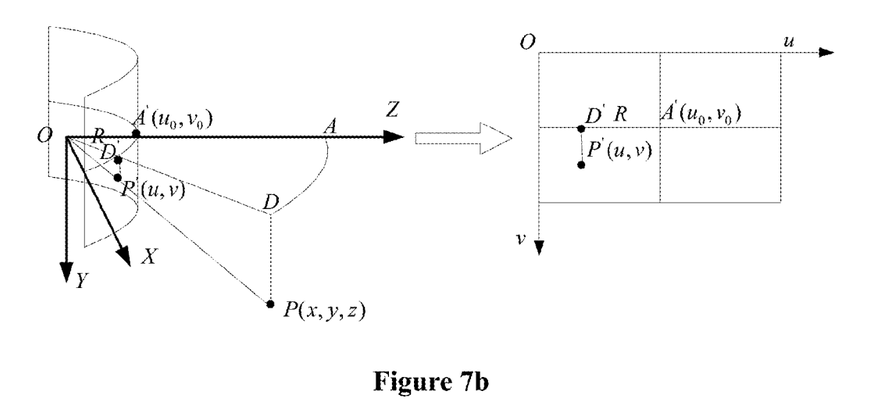
FIG. 7b is a schematic diagram of imaging of a cylinder model.

A case that the shooting device is a fisheye camera is described below. The fisheye camera is mounted at the rear of the ego vehicle. The fisheye camera has a wide visual field which may be up to 180 degrees, and a wide area can be observed. However, the object in an image shot by the fisheye camera is deformed, especially an object nearby the fisheye camera. The deformation of the object in the fisheye image is the same, and object detection may be performed on the fisheye image. In practical application, in order to ensure a high detection rate, the fisheye image may be converted into a cylinder image or a plane image, and the object detection may be performed on the converted image. FIG. 7a is a schematic diagram of a fisheye camera model and FIG. 7b is an imaging diagram of a cylinder model. A conversion equation from the fisheye image to the cylinder image is as follows:

$$\begin{bmatrix} x'' \\ y'' \\ z'' \end{bmatrix} = R''_{wc2} \cdot R'_{cw1} \cdot \begin{bmatrix} \cos((u'-u_0) \cdot d\theta) \\ \sin((u'-u_0) \cdot d\theta) \\ \dfrac{(v'-v'_0)}{ay'} \end{bmatrix}$$

$$p''(u'',v'') = G(P''(x'',y'',z''))$$

p"(u",v") is a pixel coordinate in the fisheye image, p"(u",v") is a point in the cylinder image, $(u_0, v_0)$ is a center of the cylinder image, dθ is an angle indicated by each pixel in the cylinder image, ay'=f'/dy', f is a focal length of the cylinder image, dy' is a vertical size indicated by each pixel in the cylinder image, G is a mapping from a coordinate of the fisheye camera to a coordinate of the fisheye image, $R_{wc2}''$ is a conversion matrix from the world coordinate system to the coordinate system of the fisheye camera, and $R_{cw1}'$ is a conversion matrix from a coordinate system of a cylindrical camera to the world coordinate system.

Figure 8A:
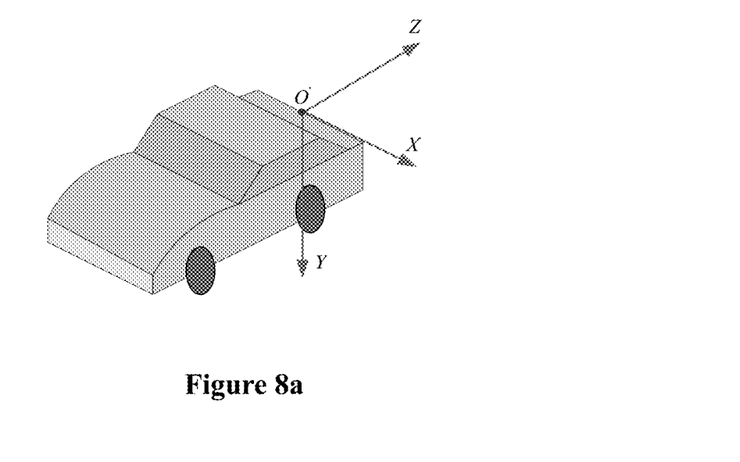
FIG. 8a is a schematic diagram of a coordinate system of a fisheye camera.
Figure 8B:
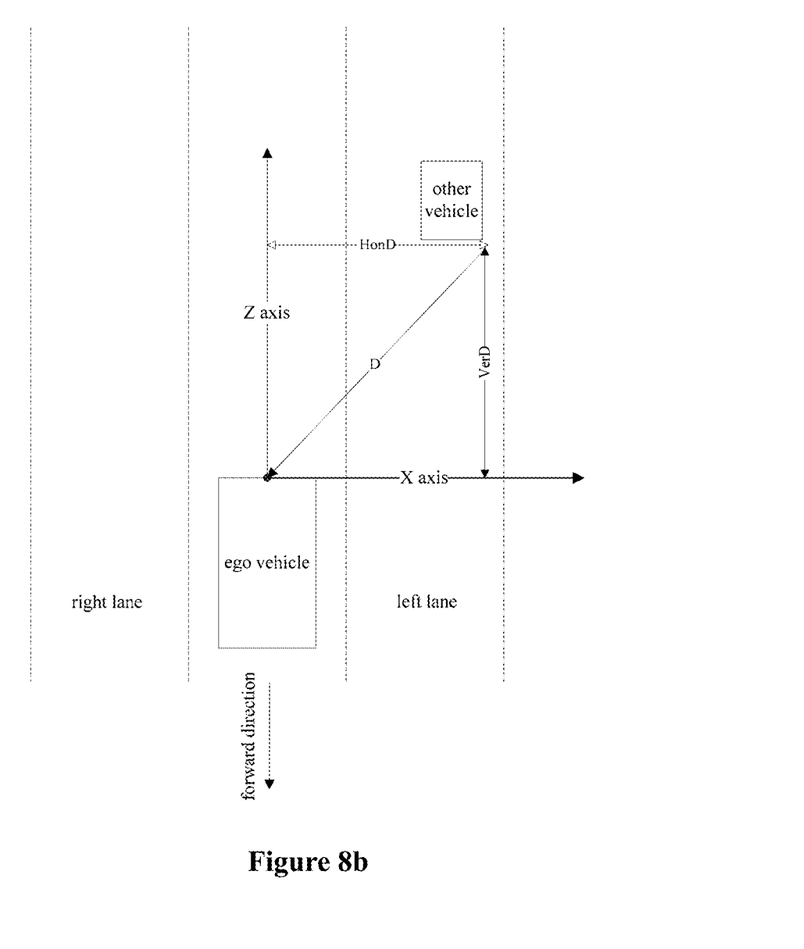
FIG. 8b is a schematic diagram of a XZ plane in a coordinate system of a camera and a position of other vehicle in the coordinate system.
Figure 8C:
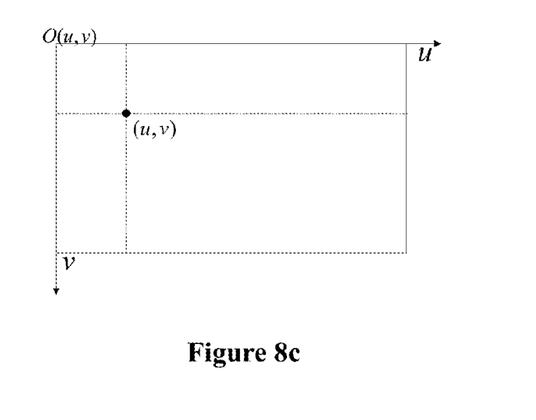
FIG. 8c is a schematic diagram of a coordinate system of a flattened cylinder image.
Figure 8D:
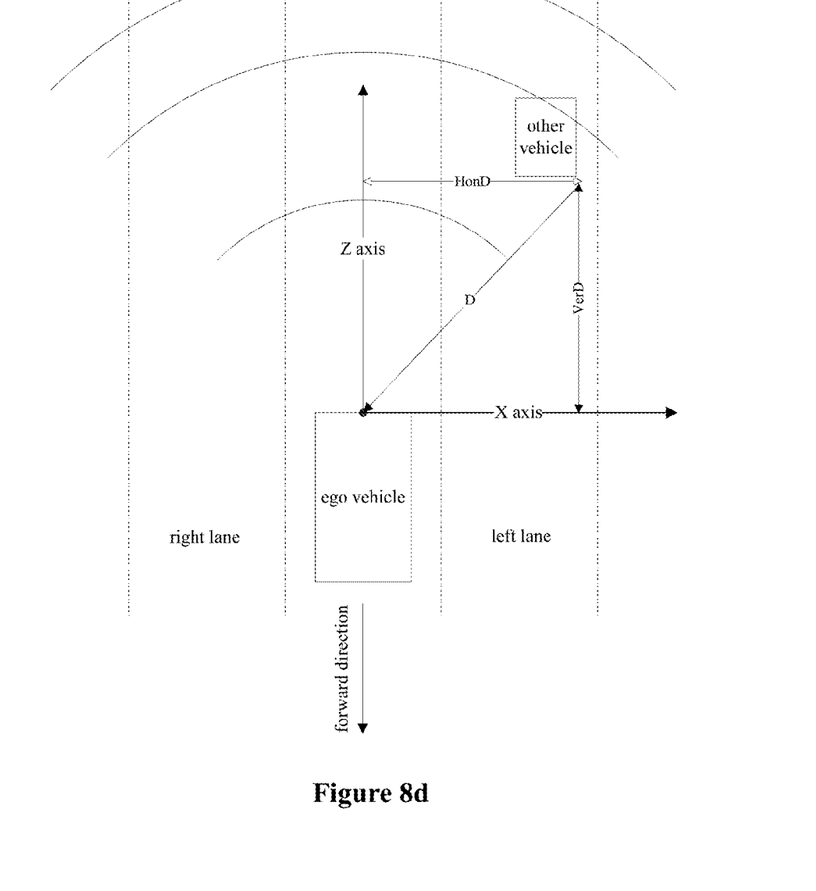
FIG. 8d is a relationship diagram between a center of a camera and an object in a cylinder model.

It is supposed that the height of the fisheye camera is Cam_H, a Euclidean distance from a target object to the fisheye camera is D, a lateral distance from other vehicle to the fisheye camera is HonD, a depth distance from other vehicle to the fisheye camera is VerD, an actual height of other vehicle is Obj_3DH, an actual width of other vehicle is Obj_3DW, a parameter of a cylinder image is ay, a pixel coordinate of the center of the cylinder image is (u0,v0) a pixel width of the original image is imgW, a pixel height of the original image is imgH, a pixel coordinate of a lower left corner of the detection gate in the image is (u,v), a pixel height of the detection gate is H, and a pixel width of the detection gate is W. FIG. 8a is a schematic diagram of the coordinate system of the fisheye camera, FIG. 8b is a coordinate diagram of a XZ plane in the coordinate system of the fisheye camera and the position of other vehicle in the coordinate system, FIG. 8c is a diagram of a coordinate system of a flattened cylinder image, and FIG. 8d is a relationship diagram between the center of the fisheye camera and the target object in the cylinder model. The detection gate may be determined by the following equations:

$u$=Foot_col−Obj_pix$W$ $v$=Foot_row $W$=Obj_pix$W$ $H$=Obj_pix$H$

Foot_row is a row in the cylinder image corresponding to a lower edge of the front plane of the target object, which is determined by the following equation:

$$\text{Foot\_row} = \frac{\text{Cam\_H} \cdot ay}{D} + v0,$$

where D=$\sqrt{\text{HonD}^2+\text{VerD}^2}$

Foot_col is a column in which a far-end pixel of the lower edge of the front plane of the target object in the cylinder image is located, which is determined by the following equation:

$$\text{Foot\_col} = u0 + \frac{1}{d\theta} \arctan \frac{\text{HonD}}{\text{VerD}}$$

dθ is a horizontal angle of each pixel in the cylinder image, $$d\theta = \frac{\varphi}{imgW},$$

and φ is a horizontal view angle.

Obj_pixH is the pixel height of the target object in the cylinder image, which is determined by the following equation:

$$\text{Obj\_pixH} = \frac{\text{Obj\_3DH} \cdot ay}{\text{VerD}}$$

Obj_pixW is the pixel width of the target object in the cylinder image, which is determined by the following equation:

$$\text{Obj\_pixW} \approx \frac{1}{d\theta} \cdot \frac{\text{Obj\_3DW}}{\text{VerD}}.$$

Figure 9:
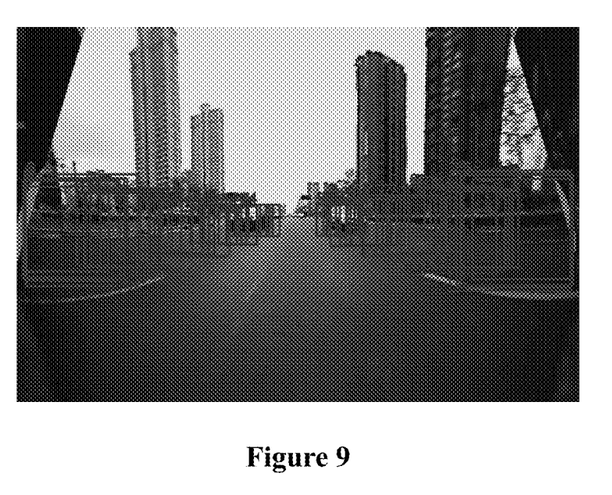
FIG. 9 is a schematic diagram of a second example of a determined detection gate position in an image.

The setting of the detection gate is described below by taking a left lane as an example. The number of the detection gates corresponding to the target objects which have same lateral distance and different depth distances on the side of the left lane is set to be n, such as n=5. In order to tolerate deviation of the vehicle in the range of the lane width, for each set depth distance, the number of the detection gates corresponding to the target objects which have different lateral distances is set to be m, such as m=5. Setting the detection gates for the target objects in the lateral direction is to tolerate deviation of the vehicle in the range of the lane width. The positions of the target objects included in the detection gates may meet the following requirement: differences between the lateral distances of the target objects having the same depth distances and a lane width fit normal distribution. Referring to FIG. 9, the five depth distances of the target object included in the detection gate are respectively 9.8 m, 5.8 m, 3.3 m, 1.4 m and 0.15 m, and lateral detecting ranges at each depth distance are respectively 4.0 m, 3.6 m, 3.4 m, 3.2 m and 2.8 m.

Figure 10:
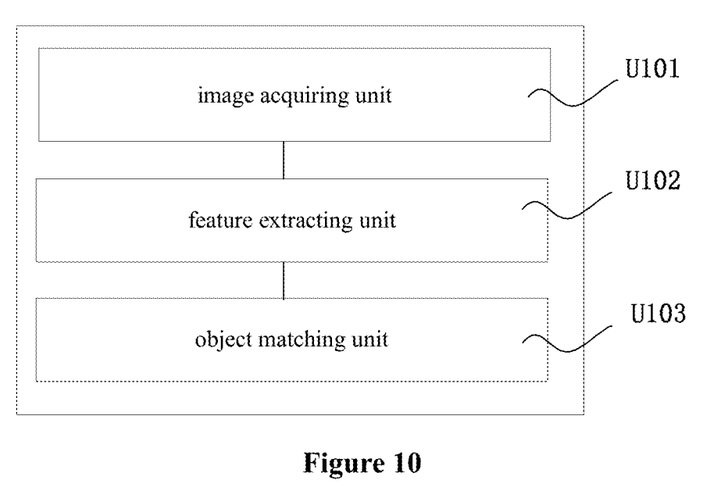
FIG. 10 is a composition block diagram of an apparatus for detecting a target object in a blind area of a vehicle according to an embodiment of the present application.

The method for detecting the target object in the blind area of the vehicle is described in detail above. Corresponding to the method, an apparatus for detecting a target object in a blind area of a vehicle is further provided according to the present application. FIG. 10 illustrates an embodiment of the apparatus, which includes an image acquiring unit U101, a feature extracting unit U102 and an object matching unit U103.

The image acquiring unit U101 is configured to acquire at least one frame of an image generated by shooting a blind area of a vehicle by a shooting device.

The feature extracting unit U102 is configured to extract an image feature of an area where at least one predetermined detection gate is located in the image.

The object matching unit U103 is configured to match the image feature with a matching template of the detection gate to determine a target object.

In the operation process of the apparatus according to the embodiment, the image acquiring unit U101 acquires at least one frame of an image generated by shooting a blind area of a vehicle by a shooting device, then the feature extracting unit U102 extracts an image feature of an area where at least one predetermined detection gate is located in the image, and finally the object matching unit U103 matches the image feature with a matching template of the detection gate to determine a target object. The same technical effect as the preceding method embodiment may be obtained according to the apparatus embodiment, which is not described herein to avoid repetition.

It is to be noted that the division for the units of the apparatus for detecting the target object in the blind area of the vehicle is not limited herein although certain units of the apparatus for detecting the target object in the blind area of the vehicle are described in detail above. Actually, according to the embodiment of the present application, the feature and function of two or more units described above may be embodied in one device or may be embodied in different devices, and the feature and function of one unit described above may be embodied in multiple subunits.

In addition, although the processes of the method of the present application are illustrated in the accompanying drawings in a particular order, it is not required or implied that those processes must be performed in the particular order or all the processes must be performed in order to achieve the desired result. Additionally or alternatively, some steps may not be performed, multiple steps may be combined into one step, and/or one step may be divided into multiple steps.

Although the principle and spirit of the present application are described with reference to several embodiments, it should be understood that the present application is not limited to the embodiments disclosed, and the division of the steps/units does not mean that the features of the steps/units can not be combined to benefit from this application, and the division is only for convenience of description. The present application is intended to embrace various modifications and equivalent arrangements within the spirit and scope of the appended claims.

The invention claimed is:

1. A method for detecting a target object in a blind area of a vehicle, comprising:
    acquiring a frame of an image generated by shooting the blind area of the vehicle by a shooting device;
    extracting an image feature of an area where a predetermined detection gate is located in the image, wherein the area where the predetermined detection gate is located in the image is determined according to a shape and a size of the predetermined detection gate, a depth distance from the target object to the vehicle and a lateral distance from the target object to the vehicle; and the shape and the size of the predetermined detection gate are determined according to a type of the target object; and
    matching the image feature of the area where the predetermined detection gate is located with a matching template of the predetermined detection gate, to determine the target object,
    wherein a count of the number of the predetermined detection gates is 2n×m, wherein n is the number of the predetermined detection gates corresponding to the target objects which have same lateral distances and different depth distances on one side of the vehicle, and m is the number of the predetermined detection gates corresponding to the target objects which have same depth distances and different lateral distances on one side of the vehicle, wherein n and m are natural numbers larger than or equal to 1.

2. The method according to claim 1, wherein the area where the predetermined detection gate is located comprises a complete image of the target object.

3. The method according to claim 2, wherein the area where the predetermined detection gate is located comprising the complete image of the target object comprises: the range of the target object corresponding to the detection gate in the blind area of the vehicle meeting a requirement of:
    an arctangent value of a ratio of the depth distance to the lateral distance from the target object included in the detection gate to the vehicle being equal to or less than a horizontal view angle of the shooting device, wherein the depth distance is a vertical distance from the shooting device arranged on the vehicle to a front plane of the target object, and the lateral distance is a vertical distance from a depth axis of the shooting device arranged on the vehicle to a left plane or a right plane of the target object.

4. The method according to claim 3, wherein in a case that the shooting device arranged on the vehicle is a fisheye camera, a height of the fisheye camera is Cam_H, a Euclidean distance from the target object to the fisheye camera is D, a depth distance from the target object to the fisheye camera is VerD, a lateral distance from the target object to the fisheye camera is HonD, an actual height of the target object is Obj_3DH, an actual width of the target object is Obj_3DW, a parameter of a cylinder image converted from a fisheye image is ay, a pixel coordinate of a center of the cylinder image is (u0,v0) a pixel width of the fisheye image is imgW, a pixel height of the fisheye image is imgH, a pixel coordinate of a lower left corner of the detection gate comprising the complete image of the target object in the cylinder image is (u,v) a pixel height of the detection gate is H, and a pixel width of the detection gate is W, the detection gate is determined by the following equations:

$$u = \text{Foot\_col} - \text{Obj\_pix}W$$

$$v = \text{Foot\_row}$$

$$W = \text{Obj\_pix}W$$

$$H = \text{Obj\_pix}H$$

wherein Foot_row is a row in the cylinder image corresponding to a lower edge of the front plane of the target object, which is determined by the following equation:

$$\text{Foot\_row} = \frac{\text{Cam\_H} \cdot ay}{D} + v0,$$

wherein $D = \sqrt{\text{HonD}^2 + \text{VerD}^2}$

Foot_col is a column in which a far-end pixel of the lower edge of the front plane of the target object in the cylinder image is located, which is determined by the following equation:

$$\text{Foot\_col} = u0 + \frac{1}{d\theta}\arctan\frac{\text{HonD}}{\text{VerD}}$$

wherein $d\theta$ is a horizontal angle of each pixel in the cylinder image, $$d\theta = \frac{\varphi}{\text{imgW}},$$

$\varphi$ is a horizontal view angle;

Obj_pixH is a pixel height of the target object in the cylinder image, which is determined by the following equation:

$$\text{Obj\_pixH} = \frac{\text{Obj\_3DH} \cdot ay}{\text{VerD}}$$

Obj_pixW is a pixel width of the target object in the cylinder image, which is determined by the following equation:

$$\text{Obj\_pixW} \approx \frac{1}{d\theta} \cdot \frac{\text{Obj\_3DW}}{\text{VerD}}.$$

5. The method according to claim 3, wherein in a case that the shooting device arranged on the vehicle is a plane camera, the arctangent value of the ratio of the depth distance to the lateral distance from the target object included in the detection gate to the vehicle being equal to or less than the horizontal view angle of the shooting device is met by meeting a requirement of:

the depth distance from the target object included in the detection gate to the vehicle being equal to or larger than $$\frac{ay \cdot \text{Cam\_H}}{\text{imgH} - v_0},$$

and the lateral distance from the target object included in the detection gate to the vehicle being equal to or less than $$\frac{ay \cdot (\text{imgW} - u_0) \cdot \text{Cam\_H}}{ax \cdot (\text{imgH} - v_0)},$$

wherein Cam_H is a mounting height of the plane camera, ax, ay are inter parameters of the plane camera, and ax=f/dx, ay=f/dy, f is a focal length of the plane camera, dx is a minimum physical size of a pixel of a plane image in a horizontal direction, dy is a minimum physical size of a pixel of the plane image in a vertical direction, imgW is a pixel width of the plane image, imgH is a pixel height of the plane image, and (u0,v0) is a pixel coordinate of a center of the plane image.

6. The method according to claim 5, wherein in a case that a pixel coordinate of a lower left corner of the detection gate comprising the complete image of the target object in the plane image is (u,v), a pixel height of the detection gate is H, a pixel width of the detection gate is W, the depth distance of the target object included in the detection gate is VerD, the lateral distance of the target object included in the detection gate is HonD, an actual height of the target object is Obj_3DH, and an actual width of the target object is Obj_3DW, the detection gate is determined by the following equations:

$u=\text{Foot\_col}-\text{Obj\_pix}W$ $v=\text{Foot\_row}$ $W=\text{Obj\_pix}W$ $H=\text{Obj\_pix}H$ wherein Foot_row is a row in the plane image corresponding to a lower edge of the front plane of the target object, which is determined by the following equation:

$$\text{Foot\_row} = v0 + \frac{\text{Cam\_H} \cdot ay}{\text{VerD}}$$

Foot_col is a column in which a far-end pixel of the lower edge of the front plane of the target object in the plane image is located, which is determined by the following equation:

$$\text{Foot\_col} = u0 + \frac{\text{HonD} \cdot ax}{\text{VerD}}$$

Obj_pixH is a pixel height of the target object in the plane image, which is determined by the following equation:

$$\text{Obj\_pixH} = \frac{\text{Obj\_3DH} \cdot ay}{\text{VerD}}$$

Obj_pixW is a pixel width of the target object in the plane image, which is determined by the following equation:

$$\text{Obj\_pixW} = \frac{\text{Obj\_3DW} \cdot ax}{\text{VerD}}.$$

7. The method according to claim 1, wherein differences between (1) the lateral distances from the target objects having the same depth distances included in the predetermined detection gates to the vehicle and (2) a lane width, fit a normal distribution.

8. The method according to claim 1, wherein matching templates of the detection gates corresponding to the target objects which have the same depth distances are the same, or matching the image feature of the area where the predetermined detection gate is located with the matching template of the predetermined detection gate to determine the target object comprises: matching the image feature of the area where the predetermined detection gate is located with the matching template of the predetermined detection gate; determining a matching degree between the matching template of the predetermined detection gate and the image feature of the area where the predetermined detection gate is located; judging whether the matching degree is larger than a predetermined judging threshold; and determining that the target object corresponding to the detection gate exists if the matching degree is larger than the predetermined judging threshold.

\* \* \* \* \*